United States Patent
Tseng

(10) Patent No.: US 12,468,006 B2
(45) Date of Patent: Nov. 11, 2025

(54) METHOD FOR DETECTION AND GEOLOCATION OF TARGET DEVICE IN 3D SPACE

(71) Applicant: Booz Allen Hamilton Inc., McLean, VA (US)

(72) Inventor: Eric Yu-Jen Tseng, McLean, VA (US)

(73) Assignee: Booz Allen Hamilton Inc., McLean, VA (US)

( * ) Notice: Subject to any disclaimer, the term of this patent is extended or adjusted under 35 U.S.C. 154(b) by 326 days.

(21) Appl. No.: 18/115,742

(22) Filed: Feb. 28, 2023

(65) Prior Publication Data

US 2024/0288530 A1 Aug. 29, 2024

(51) Int. Cl.
*G01S 5/02* (2010.01)
*G01S 5/14* (2006.01)

(52) U.S. Cl.
CPC .......... *G01S 5/0221* (2013.01); *G01S 5/0278* (2013.01); *G01S 5/14* (2013.01)

(58) Field of Classification Search
CPC ......... G01S 5/0221; G01S 5/0278; G01S 5/14
USPC ........................................................ 342/451
See application file for complete search history.

(56) References Cited

FOREIGN PATENT DOCUMENTS

| AU | 2012203060 A1 | * | 12/2012 | ............ H04W 4/028 |
| AU | 2012273701 A1 | * | 1/2014 | ............ G01S 5/0252 |
| CN | 105807931 B | * | 9/2019 | .............. G06F 3/011 |
| EP | 3879298 A2 | * | 9/2021 | ............. A61B 5/113 |

* cited by examiner

*Primary Examiner* — Harry K Liu
(74) *Attorney, Agent, or Firm* — VOLPE KOENIG

(57) ABSTRACT

Methods and devices for detection and geolocation of a target device in three-dimensional space are provided. A method may include capturing baseline information in an area of operation and receiving information associated with one or more detected signals from a target device within the area of operation. The one or more detected signals from the target device include information indicating a device identifier associated with the target device. The method may include filtering the baseline information from the one or more detected signals from the target device based on the indicated device identifier. The method may include calculating a three-dimensional location of the device based on a signal strength of the detected one or more signals and a plurality of three-dimensional locations where the one or more signals were detected. The method may include plotting the three-dimensional location of the target device on a map within a graphical user interface (GUI).

20 Claims, 8 Drawing Sheets

LEGEND

○ Location where Signal was Detected
☆ Actual Location of Signal Source (Dashed Line Shows Altitude)
□ Estimated Signal Source Location within Two-Dimensional Environement
⬡ Estimated Signal Source Location within Three-Dimensional Environment Convert Coordinates from Geodetic Coordinates to Geocentric Cartesian Coordinates to use for Least Squares Calculation:

```
private double[ ] calcGeodeticToECEFcart(double lat, double lon, double alt) {
    double x = 0.0; // (N(lat) + height) * cos(lat) * cos(lon)
    double y = 0.0; // (N(lat) + height) * cos(lat) * sin(lon)
    double z = 0.0; // ((minor^2/major^2) * N(lat) + height) * sin(
    double b = 6356752.3142; //minorAxis in meters
    double a = 6378137.0; //majorAxis in meters
    double eccentricitySquared = 0.00669437999014; //e^2
    lat = Math.toRadians(lat);
    lon = Math.toRadians(lon);

//Get N(lat)
    double nLat = a/Math.sqrt(1-eccentricitySquared * Math.pow(Math.sin(lat),2));
    //Get x
    x = (nLat + alt) * Math.cos(lat) * Math.cos(lon);
    //Get y
    y = (nLat + alt) * Math.cos(lat) * Math.sin(lon);
    //Get z
    z = ((1-eccentricitySquared) * nLat + alt) * Math.sin(lat);

double [ ] returnArr = {x,y,z};
    return returnArr;
}
```

FIG. 4

Calculate Distance from RSSI and frequency:

double c = 299792458.0; //Speed of light constant
double lossConstant = 3.0; //2.7 is free space, 3.5 is heavy urban area
double freqHz = inputs.getFreq() * 1000000.0; //Inputs.getFreq is in Mhz. We need to make it Hz
double wavelength = c / freqHz;
double lossPath = 4.0 * Math.*PI* / wavelength;
double numerator = -1.0 * inputs.getRssi() – 20.0 * Math.*log10*(lossPath);
double denominator = 10.0 * lossConstant;
double equation = numerator / denominator;
double distanceFromRssi = Math.*pow*(10, equation);

FIG. 5

Calculate Weight from RSSI:

double weight = -1/4500 * Math.pow(Double.*valueOf*(inputs.getRssi()) , 2) + 2.25;

FIG. 6

METHOD FOR DETECTION AND GEOLOCATION OF TARGET DEVICE IN 3D SPACE

FIELD OF INVENTION

The present disclosure concerns methods for detecting and determining a location of one or more target devices associated with a user. Specifically, the present disclosure concerns wardriving methods that involve trilateration of target wireless devices in three-dimensional space.

BACKGROUND

Positioning techniques are widely implemented in wireless systems to provide mobile devices with spatial awareness, facilitate discovery of network infrastructure nodes, and support mobility within networks. Trilateration and triangulation are two types of positioning techniques used in, for example, Global Positioning Satellite (GPS) systems, Wireless Local Area Networks (WLANs) and cellular networks.

In electronic warfare, trilateration and triangulation techniques may be useful for a range of purposes. For example, there may be a need to identify and locate targets for reconnaissance, intelligence, and/or surveillance missions. Specifically, aforementioned techniques may be useful in wardriving applications, which relate to the detection and geolocation of devices in a given area.

SUMMARY

Methods and devices for detection and geolocation of a target device in three-dimensional space are provided. A method may include capturing baseline information in an area of operation and receiving information associated with one or more detected signals from a target device within the area of operation. The one or more detected signals from the target device include information indicating a device identifier associated with the target device. The method may include filtering the baseline information from the one or more signals received from the target device based on the indicated device identifier. The method may include calculating a three-dimensional location of the device based on a signal strength of the detected one or more signals and a plurality of three-dimensional locations where the one or more signals were detected. The method may include plotting the three-dimensional location of the target device on a map within a graphical user interface (GUI).

BRIEF DESCRIPTION OF THE DRAWING(S)

FIG. 4 illustrates an example of code used to convert geodetic coordinates to geocentric cartesian coordinates;

FIG. 5 illustrates an example of code used calculate the distance from a location where a signal is detected to the location of the signal source;

FIG. 6 illustrates an example of code used to calculate, based on an RSSI, a weighting coefficient to be applied to a data point in the calculation of the location of the signal source;

Figure 7A:
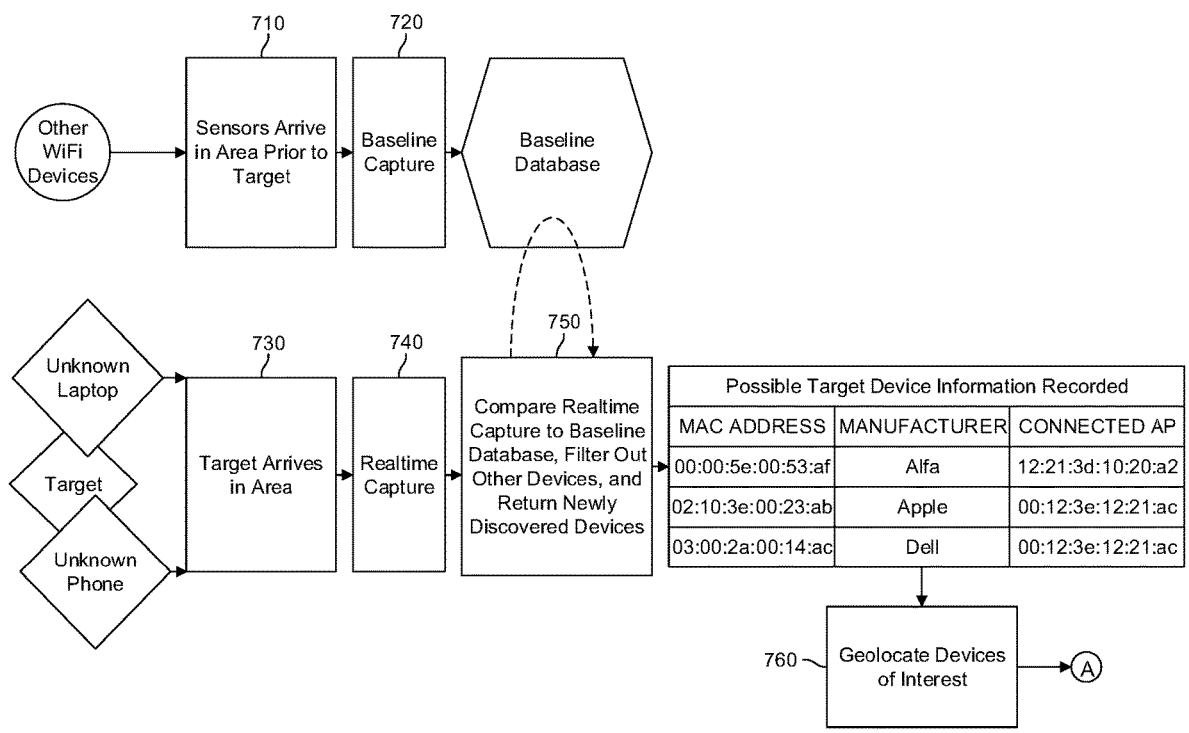
Figure 7B:
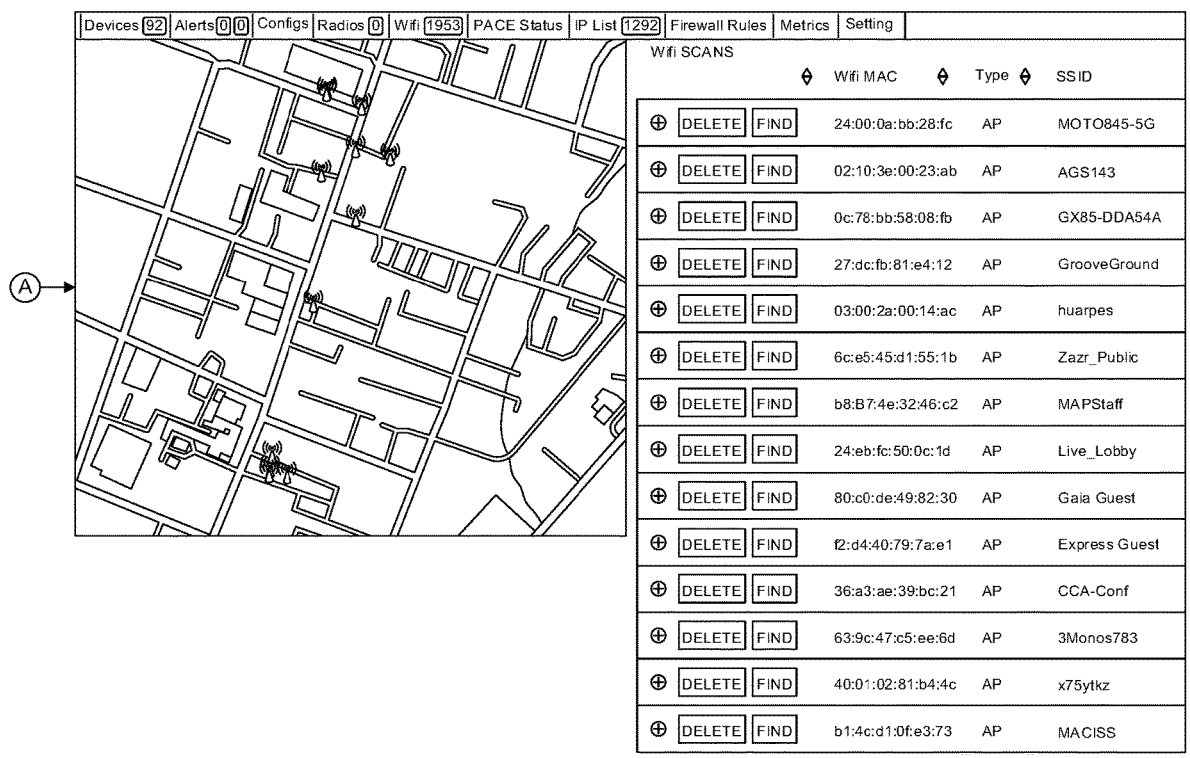

FIG. 7A illustrates an example method for baselining an area of operation, detecting signals in the area from a potential target device, recording information about such signals, and geolocating the potential target device based on the recorded information; and FIG. 7B is an illustration of a graphical user interface (GUI) displaying newly discovered devices on a map along with recorded data associated with the newly discovered devices, consistent with FIG. 7A.

DETAILED DESCRIPTION OF THE PREFERRED EMBODIMENTS

Methods are disclosed for detection and geolocation of a target device. There is a user-base that requires serverless wardriving capabilities in a very minimal form factor. This user-base may need to associate a target's devices with the target while operating in an unknown area. This user-base may also require means for identifying a target's electronic devices through Bluetooth or Wi-Fi Medium Access Control (MAC) addresses. In addition, there is a need to conduct trilateration of signals using systems having small omnidirectional antennas (e.g., Wi-Fi antennas as may be implemented in mobile devices) and relatively weak processing power (e.g., devices using ARM processors). Such systems may afford flexibility when deploying sensors to capture signals for trilateration, as mobile devices may be easily repositioned around an area of operation and may be deployed alone or in combination with stationary sensors.

A "target" may be an individual person about whom the user-base is interested in gathering information. The user-base may desire to gather information about the devices the target uses, the networks the target connects to, and more. For example, for Wi-Fi-enabled target devices, it may be advantageous to identify which Access Points (APs) the Wi-Fi-enabled target device is connected to. A wardriving device according to at least one embodiment described herein may move around an area of operation with a Wi-Fi-capable antenna and chipset and use an algorithm that attempts to locate active Wi-Fi devices in the area.

The user-base may potentially desire to conduct cyber operations against the target. The user-base may also desire to geo-locate the "target" and track their presence and/or movement in an area.

There is a need to conduct such methods to obtain positioning information of a target with a high degree of accuracy and precision. It may be advantageous to perform trilateration to identify the position of the target in three-dimensional (3D) space, as such a technique may provide more accurate positioning information as well as more detailed positioning information.

A problem faced by users of existing wardriving techniques and devices is that such techniques may require a relatively large footprint, which may attract unwanted attention. For example, the user may need to operate a laptop computer Linux with an external Wi-Fi chip. Another problem faced by users of existing wardriving techniques is that there are few, if any, tools that adequately address the "targeting" requirements described above. Lastly, some wardriving solutions may depend on a server for (1) pushing data to a server which runs a geolocation algorithm and (2) pulling geolocation coordinates from that server after the algorithm/calculation is executed. For example, one of the most popular wardriving solutions, WiGLE, depends on crowdsourced data. A drawback of crowdsourced data is that the data may be outdated and incorrect. Another drawback is that dependence on crowdsourced data may require internet/server connectivity.

An objective of embodiments described herein may be to enable a user-base to wardrive and gather the information of all Wi-Fi and Bluetooth devices in the area and plot them on a map.

A further objective of embodiments described herein may be to enable the user-base to record historical data of Wi-Fi and Bluetooth devices in the area and plot the locations of such devices on a map. It is desirable that historical data be capable of comparison to real-time data or other historical data to identify differences.

A further objective of embodiments described herein may be to assist the user-base in associating detected Wi-Fi and Bluetooth devices with an individual person of interest, to geolocate their devices, and to plot them on a map.

A further objective of embodiments described herein may be to assist the user-base in conducting cyber operations against the target.

A further objective of embodiments described herein may be to secure "Bring-Your-Own" (BYO) mobile devices (as opposed to locked-down government devices) by providing a root-less firewall for implementation in mobile systems (e.g., Android based systems) as well as a basic host-intrusion detection system. Embodiments described herein may provide some means of configuration management for such BYO mobile devices. Embodiments described herein may support the implementation of both Network Intrusion Detection and Host Intrusion Detection in servers along with a simple-to-use administration and monitoring tool. In one or more of the embodiments described herein, the intrusion detection functionality may be implemented via an open source packet capture application (e.g., running on a mobile device such as an Android device). The application may provide blacklisting and/or whitelisting capabilities. The intrusion detection functionality may, for example, operate by recording all presently installed software along with the application name, the size, date of install, and other data. The installed software and associated data may be provided to a configuration management server, and if any changes are detected, the user of the mobile device and/or the server may be notified of a possible intrusion.

Methods as described herein may be implemented in small-footprint and/or small-formfactor devices. For example, Android devices may perform wardriving operations (geolocation of signals, storage of collected data, and provide a user interface which displays relevant data) with at least the following modes of operation: (1) individual collection and geolocation of signals, (2) collection and geolocation of signals from devices having serverless connections to other sensors, or (3) collection and geolocation of signals from devices having connections to a server.

Although various embodiments described herein are described contextually as being implemented in an Android device, those of skill in the art will appreciate that a system using other mobile operating systems (e.g., Tizen, Sailfish, Ubuntu, Kali, or Plasma Mobile, etc.) may also be configured to perform the methods described herein.

A device implementing one or more methods as described herein may be a small-footprint and/or small-formfactor device. A device may have one or more of the following: a power source; a Wi-Fi and/or Bluetooth chip that is capable of operating in a monitoring mode and that is either attached directly through soldered pins or a USB port; another Wi-Fi chipset that can be used to transmit signals or be set as an AP that is optimally included with a computing platform; a computing platform that continually operates an application (i.e., a program that executes one or more methods as described herein) without user input but may be configurable (e.g., by a user) to alter modes of operation; and/or a GPS chip attached directly through soldered pins or a USB port.

Figure 1:
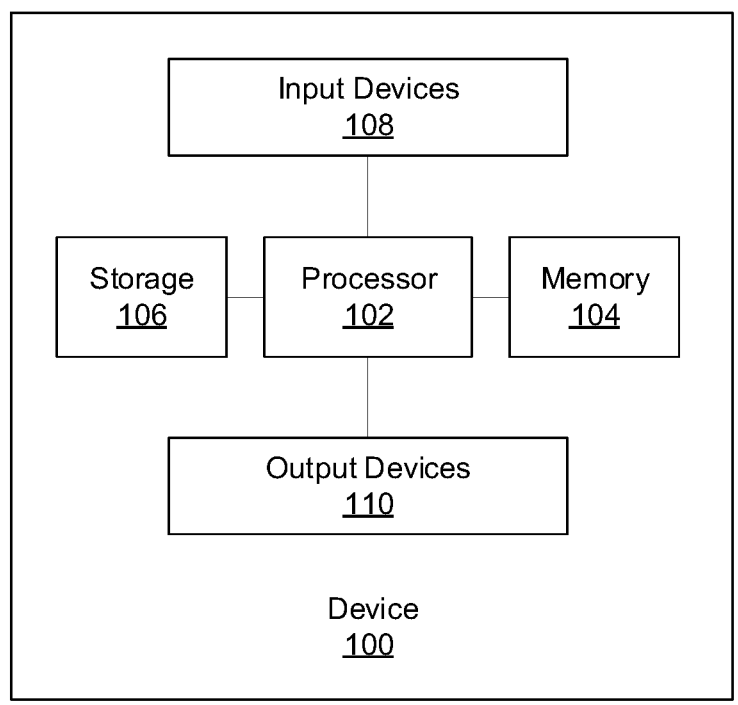
FIG. 1 is a block diagram of an example device in which one or more features of the disclosure can be implemented.

FIG. 1 is a block diagram of an example device 100 in which one or more features of the disclosure can be implemented. The device 100 could be one of, but is not limited to, for example, a handheld device, a mobile phone, a tablet computer, a laptop computer or other computing device. The device 100 includes a processor 102, a memory 104, a storage 106, one or more input devices 108, one or more output devices 110, It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, without limitation, random access memory (RAM), dynamic RAM, or a cache. In some configurations, the memory 104 stores an operating system.

The storage 106 includes a fixed or removable storage, for example, without limitation, a hard disk drive, a solid state drive, an optical disk, or a flash drive. In some configurations, the storage 104 stores an operating system. The input devices 108 include, without limitation, a keyboard, a keypad, a touch screen, a touch pad, a detector, a microphone, an accelerometer, a gyroscope, a biometric scanner, a GPS chip, or a network connection (e.g., a wireless local area network card or other card for or reception of wireless IEEE 802 signals, Bluetooth signals, and/or other types of wireless signals). The output devices 110 include, without limitation, a display, a speaker, a printer, a haptic feedback device, one or more lights, one or more antennas (e.g., one or more omnidirectional antennas), a GPS chip, or a network connection (e.g., a wireless local area network card or other card for transmission of wireless IEEE 802 signals, Bluetooth signals, and/or other types of wireless signals).

In operation, the storage 106 and memory 104 store an operating system. The operating system performs various tasks such as scheduling software for execution, managing hardware, and performing various tasks for user interaction. The output devices 110 include a communication device, which, in various examples, includes one or more of a wireless or wired communication device, one or more sensors, one or more transceiver, one or more antennas, or one or more other devices for communicating with and/or receiving communications from one or more external devices.

The device may be configured to operate in one or more of the following modes: (1) individual use (i.e., independently from other sensors), (2) with serverless connections to other sensors, or (3) with connections to other sensors via a server. A device may be configured by the user (e.g., through an Android device), via USB tethering, Bluetooth, or other wireless means of communication.

Figure 2A:
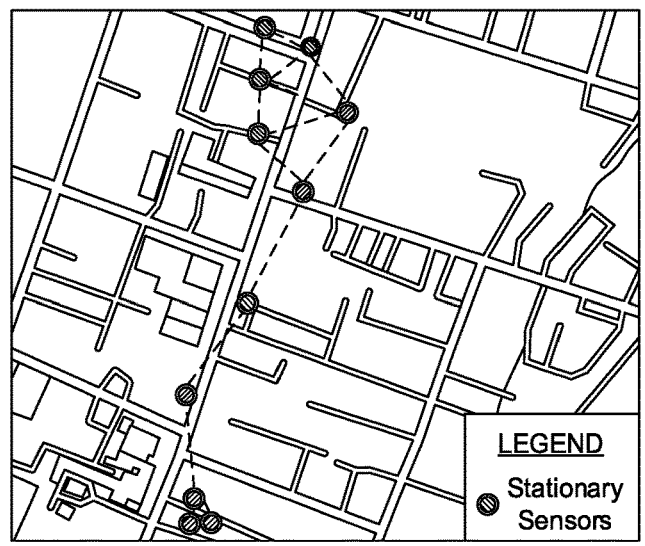
FIG. 2A is an illustration of a serverless network of small form-factor sensors as may be used to implement one or more of the methods described herein.
Figure 2B:
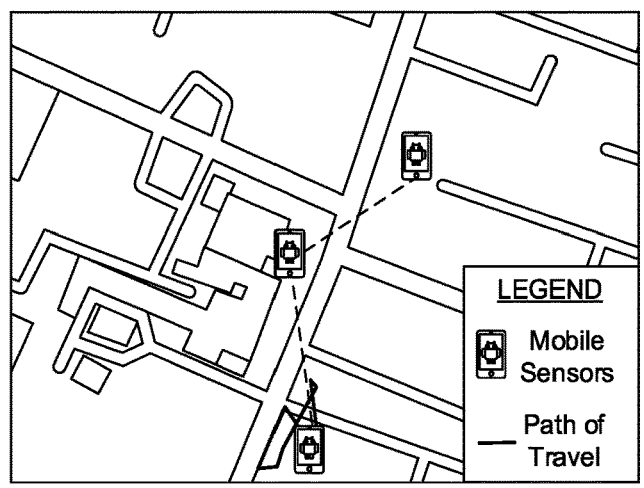
FIG. 2B is an illustration of a serverless network of mobile sensors as may be used to implement one or more of the methods described herein.
Figure 2C:
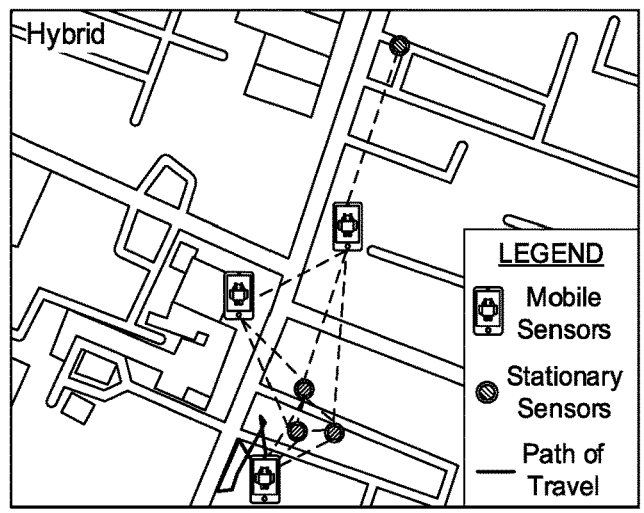
FIG. 2C is an illustration of a serverless network of small form-factor and mobile sensors as may be used to implement one or more of the methods described herein.

FIGS. 2A-2C are illustrations of a serverless network of sensors as may be used to implement one or more of the methods described herein. As shown by the dashed lines in FIGS. 2A-2C, each sensor may communicate directly with each other without connectivity to an AP or other means. Each sensor may be an Android phone or a small-form-factor device, which may use Bluetooth, WiFi Direct and/or WiFi Aware protocols for communication and which do not require an external radio or external WiFi chip. A mesh-network is established using established and known protocols or software-based routing. A routing table with a calculated "distance" is established with routing logic and methods that may mirror the routing methods used in an Enhanced Interior Gateway Routing Protocol (EIGRP). Communication with/between the sensors may be encrypted, e.g. with pre-shared symmetric keys or passwords.

As depicted in FIG. 2A, the sensors may be small form-factor stationary sensors. Such stationary sensors may be placed discretely around the area of operations. Each sensor may have a compute board or processing component supporting wardriving capabilities. The sensors may also have a WiFi and/or Bluetooth chip with monitoring mode capabilities, a GPS chip, one or more antennas coupled to the WiFi and/or Bluetooth chip and/or to the GPS chip, and a battery for power. The sensors transmit and share recorded data with each other and sync their databases e.g., periodically or continually. The sensors transmit using the mesh network described above.

As depicted in FIG. 2B, the sensors may be individual mobile Android-based sensors. As shown, the sensors may be carried by a team of users. It is envisioned, however, that a mobile individual Android-based sensor may be deployed by one person operating an Android application in "individual mode" or by multiple people operating in an area with our Android application (e.g., a program that executes one or more methods as described herein). In the individual mode, a sensor may have the same geo-location capabilities as a small-formfactor sensor acting on its own, but may move around a target area. The individual mobile sensor may have a path of travel within the target area as shown in FIGS. 2B and 2C. For a moving target, geolocation may require multiple sensors using an application that carries out geolocation methods as are described in subsequent paragraphs herein. For a stationary target, in some stances, geolocation may be performed using a single mobile sensor that detects multiple signals transmitted by the target while moving within the target area. The Android-based sensors transmit and share recorded data to each other and sync their databases continually or periodically. The Android-based sensors may transmit using the mesh network described above.

As depicted in FIG. 2C, in a hybrid scenario, small form-factor stationary sensors may be used alongside mobile (e.g., Android-based) sensors, substantially in accordance with the paragraphs above. If a mobile Android-based sensor does not have a capable wireless chip that can operate in a monitoring mode, the mobile Android-based sensor may connect to a small-form-factor sensor or with other mobile Android-based sensors using the mesh network described above or through USB tethering.

A device (e.g., a small form-factor device) according to an embodiment described herein may be configured with basic wardriving capabilities. The device may be configurable to capture a baseline of an area of operation, filter for potential target devices, track one or more target devices, and/or enter a cyber offense mode.

Basic wardriving capabilities of a device may include detection, storage, and geolocation. A sensor performing detection in an area of operation has its WiFi chip powered on. The WiFi chip collects relevant data from various WiFi signals including, but not limited to: a MAC address of the device generating the signal; a received signal strength indicator (RSSI) of the signal; a service set identifier (SSID) or Basic SSID (BSSID), if present; a frequency of the detected signal; encryption methods supported or used; a latitude of the sensor at the time the signal is received; a longitude of the sensor at the time the signal is received; an altitude (e.g., a Height Above Ellipsoid, or elevation above a mathematical model that represents the shape of the earth) of the sensor at the time the signal is received; and/or a UNIX timestamp associated with when the signal was received. From the MAC Address, an Organizational Unique Identifier (OUI) of the device may be read to potentially find the device manufacturer. For devices that use MAC Address randomization, those of skill in the art may use various device fingerprinting methods to identify these devices throughout pseudo MAC Address changes and assign a fingerprint ID to the device.

The device stores the data collected from the various detected signals in a Structured Query Language (SQL) database with the relevant data mentioned above. The SQL database may include at least two tables: a Wifi_Inputs table, which includes all of the captured data, and a Wifi_Devices table. The key of the Wifi_Inputs table auto-increments. The Wifi_Inputs table includes historical data and also stores location information including all data necessary to geolocate WiFi or Bluetooth signal sources.

The Wifi_Devices table contains a listing of detected WiFi devices and may use a listing of the MAC addresses/BSSIDs as a key. The table may enable the program to quickly reference and return a list of observed WiFi devices without needing to parse through all the rows of data in the Wifi-_Inputs table. Along with the datapoints included above, the Wifi_Devices table may also record the first timestamp, the last timestamp, the last calculated geolocated position, frequency, channel, manufacturer of the chip, WiFi security protocol used, the MAC Addresses of all previous APs the device has connected to, the MAC Addresses of previous clients that has connected to the device, and WiFi device type specifying if it is likely a client, AP, bridge, or other type. If a fingerprint is captured, the database also records the fingerprint ID. One purpose of this table may be to quickly locate the existence of a MAC/BSSID along with when it was first and last detected. Another purpose of this table may be to quickly plot all geolocated WiFi devices using a geospatial tool along with the connected AP or clients. Recording when the MAC address/BSSID was first and last seen may help to inform the user of basic historical information and assist the program in filtering the WiFi devices to be plotted when mapping historical data. The user may also add labels associated with a WiFi device listed in the table.

A use case consistent with at least one embodiment may be described as follows. To determine the pattern-of-life of a fingerprinted device using MAC Address Randomization, a database query may be carried out to return a list sorted by date of all APs the targeted device has been observed connecting to. This involves querying the Wifi_Inputs table with a MAC Address associated with the target device. The query operation will then select the rows in which the connected AP differs from the next row. From this query, the user may also obtain information indicating when the target device connected to the AP, and when the target device potentially disconnected from that AP. The locations of the APs may be plotted using a geospatial tool and allow the user to scroll through where the target device has connected while showing the start and end of the connection. Another capability may allow the user to plot all devices currently connected to an AP and plot them on a geospatial tool, showing the WiFi network topology. The user-base may then choose to conduct cyber offensive operations. One example of this includes allowing the user-base to create a target whitelist or blacklist using the following criteria: (1) MAC Addresses, (2) device fingerprints, (3) chip manufacturers, (4) AP SSIDs. Additional criteria may be added, such as a geofence or datetime range. Once the target list is defined and enabled, the device may automatically send continuous streams of de-authentication packets to every discovered device that meets the criteria. Targeting AP SSIDs denies access to a campus network. Targeting fingerprints and MAC Addresses denies individual devices from connecting to any WiFi network. Targeting chip manufacturers proves useful when the targeted area uses WiFi-based cameras or other security and surveillance devices. The user-base may create a target list of manufacturers prior to entering a target area. The user-base may then fly the device on a Unmanned Aerial Vehicle (UAV) into the target area. When a signal source that meets the target criteria is detected, the device may then automatically perform the attack without user input; this is especially useful for WiFi-based security devices.

The device may geolocate a signal source using various optimized methods. Trilateration is one method utilized in geolocation involving the calculation of a location of a signal source using multiple known distances from multiple known locations.

In a two-dimensional environment, given a known distance to a signal source from each of three known locations, a device may determine the position of the signal source as the intersection of circles centered at each of the three known locations and having radii equal to the respective known distances to the object. Alternatively, the device may determine the position of the signal source by averaging the coordinates of each of multiple known locations.

Figure 3A:
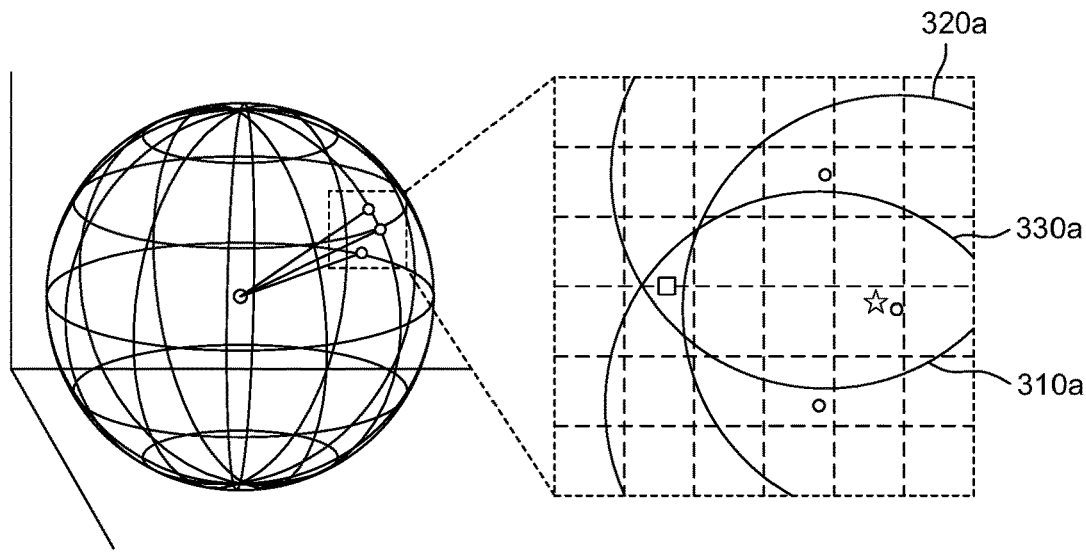
FIG. 3A is a diagram illustrating an exemplary method for trilateration of a device in two dimensions.

FIG. 3A is a diagram illustrating an exemplary trilateration method as may be utilized in a two-dimensional environment for calculating the location of a target device. As shown in FIG. 3A, a signal is detected by sensors positioned at three different locations. The sensor data is analyzed to derive circles 310a, 320a, and 330a, centered at each of the three different locations. The radii of the circles 310a, 320a, and 330a are determined in accordance with a distance to the signal source, which may be calculated according to one or more of the methods as described in subsequent paragraphs. An estimated location of the signal source in two dimensions may be approximated by the intersection of the circles.

In some cases, such as the example depicted in FIG. 3A, if the signal source is actually positioned at a different elevation or altitude than the elevations of each detection instance, the estimated position of the signal source may be erroneous and may differ substantially from the actual location of the signal source. When using trilateration methods that consider only the two-dimensional locations where signals are detected, the calculated position may be confined to a spherical or ellipsoidal surface (i.e., the Earth's surface). At the same time, the signal strength of the detected signal may be weaker due to the signal source's higher elevation. Hence, the calculated location of the signal source may be farther from some or all of the known locations than the actual distance.

In some trilateration methods, a user may account for altitude of the locations where signals are detected. For example, a user may determine the location of the signal source as the intersection of spheres centered at each of the three known locations and having radii equal to the respective known distances to the signal source. Accounting for the altitude of the locations were signals are detected may provide enhanced accuracy, especially when utilized in conjunction with an optimization method that then account for the third dimension when accounting for distance.

Figure 3B:
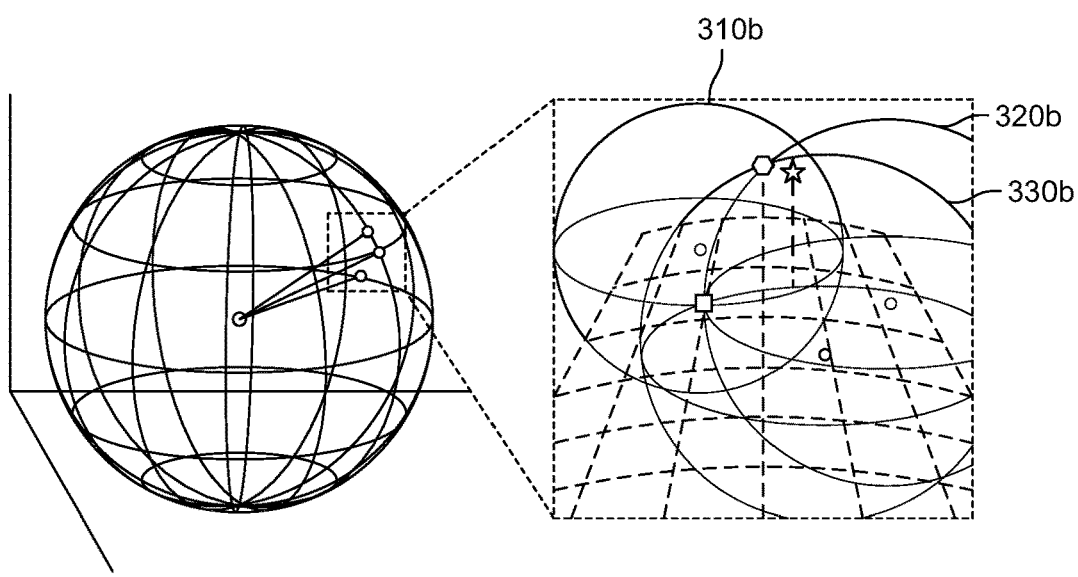
FIG. 3B is a diagram illustrating an exemplary method for trilateration of a device in three dimensions.

FIG. 3B is a diagram illustrating an exemplary trilateration method for calculating the location of a target device as may be utilized in the same environment as shown in FIG. 3A, but in three dimensions. As shown in FIG. 3B, the signal is detected by sensors positioned at three different locations. The sensor data is analyzed to derive spheres 310b, 320b, and 330b, centered at each of the three different locations. The radii of the spheres 310b, 320b, and 330b are determined in accordance with a distance to the signal source, which may be calculated according to one or more of the methods as described in subsequent paragraphs. The three-dimensional distance to the signal source may be calculated, for example, using the same method used to estimate the two-dimensional distance to the signal source. An estimated location of the signal source in three dimensions may be approximated by the intersection of the circles, which in comparison with the two-dimensional estimate of the location of the signal source, may exhibit a smaller degree of error relative to the actual location of the signal source.

In an optimized method for geolocation employing trilateration methods as proposed herein, a device may detect signals and store location information including data points as outlined substantially in paragraphs above. Each data point is stored with a corresponding latitude, longitude, and altitude where a signal is detected, which may be used to calculate the distance to the source of the signal and in turn the three-dimensional location of signal source (i.e., a target device that transmitted the signal). The distance between the signal source and the center of the sphere may be calculated using a formula which takes a signal strength metric, (e.g., RSSI) as an input and outputs a distance (e.g., in meters). An optimized calculation of the three-dimensional location of the signal source may be obtained by one or more methods. For instance, as described in greater detail in paragraphs below, a weighted least squares calculation may be used to optimize the calculation of the center of the sphere given the set of data.

As described in paragraphs above, the locations where the signals were detected may be stored as geodetic GPS coordinates (i.e., latitude, longitude, and altitude) using the World Geodetic System 1984 (WGS-84) standard coordinate reference system. In order to avoid confinement to the ellipsoidal or spherical surface of the Earth and to provide workable geometry for use in the calculations described herein, the geodetic GPS coordinates representing the three-dimensional locations where the signals were received may be converted to geocentric Cartesian coordinates (i.e., XYZ Cartesian coordinates). Various calculations may then be performed using the XYZ cartesian coordinates to obtain an estimated position of the signal source, which may then be converted back to WGS-84 Geodetic GPS coordinates for plotting/analysis using geospatial tools.

FIG. 4 is an example of code as may be used to convert geodetic coordinates to geocentric cartesian coordinates.

Those of skill in the art will appreciate that an algorithm for converting geodetic coordinates to geocentric cartesian coordinates may be implemented using a range of programming languages and need not strictly follow the structure used in the example of FIG. 4.

The distance to the signal source from a location where a signal has been detected may be calculated based on signal strength (e.g., RSSI) and frequency information of the signal. For example, for each data point in the dataset of stored location information, where the MAC Address/BSSID equals the MAC Address/BSSID of the signal source of interest, the device may calculate the distance given the RSSI and frequency. It should be noted, however, that Wi-Fi signal strength may vary for a variety of reasons (e.g., power of the transmitting source, gain of the receiving antenna, etc.). Formulas for calculating the distance may consider various other factors, such as attenuation, signal decay, and/or fade margin, which may be dependent on the of environment in which the target and sensors are located. For instance, the signal decay and/or fade margins may differ depending on the environment type that the target and/or sensors are operating in. Environment types (e.g., indoor/outdoor environments, urban/suburban/rural environments) may affect the factors upon which distance calculations or calculations of three-dimensional locations are made. Furthermore, formulas used to calculate the distance may differ depending on size and quality of the antenna or antennas used to receive the signals. In some implementations, a user may calibrate or adjust formulae based on the antenna used and the frequency of the signal.

FIG. 5 is an example of code as may be used to calculate the distance from a location where a signal is detected to the location of the signal source. In the specific example shown in FIG. 5, the calculation accounts for the difference in signal attenuation within different environments. As shown, a greater amount of attenuation is assumed for a heavy urban environment, in comparison with the attenuation of a signal in free space.

From the signal strength and frequency associated with each three dimensional location where a signal is received, a formula may return a calculated distance from each XYZ coordinate to the signal source. The device may assign each stored location information representing the three dimensional location where the one or more signals were received a weighting coefficient that is determined based a the measured signal strength associated with a respective data point. For example, for each three-dimensional location in the dataset, a weighting formula following a curve as follows may be applied as follows:

$$weightFromRssi(-90) == 0.45$$

$$weightFromRssi(-75) == 1$$

$$weightFromRssi(-60) == 1.45$$

$$weightFromRssi(-33.5) == \sim 2.0$$

The reasoning for applying the weighting formula may be as follows: at approximately −90 dBm RSSI, the signal strength may be attenuated due to a variety of factors. This makes the distance calculation less likely to be accurate. A weak signal may result from the distance between the signal source and the sensor, the signal passing through various materials, reflecting off of another surface, a combination of two or more factors. Accordingly, a signal having an RSSI of −90 dBm results in many outliers when attempting to estimate distance and a lesser weight is applied. At an RSSI of −75 dBm, distance estimates may exhibit significant but less variation when compared to distance estimates based on weaker signal strengths. At an RSSI of −60 dBm, distance estimates are more predictable. From −30 to −40 dBm, distance estimates are quite predicable and accurate. Hence, distance estimates based on signals having higher RSSIs are given greater weight in determining the best-fit center.

FIG. 6 is a screenshot capturing an example of code used to calculate a weighting coefficient to be applied to a data point in the calculation of the location of the signal source. In some embodiments, the device may perform a least squares regression analysis to optimize an estimated three-dimensional location of a target device. A model function may be derived by computing the Jacobian matrix given the following: (1) component values using a function that obtains the distance between the proposed center's coordinates and the observed point's coordinates; and (2) component derivatives with respect to:

$$f(v \text{ of observedPoint}) = v \text{ of center}$$

where v is the coordinate value:

$$X: (center.getX(\ )-observedPoint.getX(\ ))/calculated\ distance$$

$$Y: (center.getY(\ )-observedPoint.getY(\ ))/calculated\ distance$$

$$Z: (center.getZ(\ )-observedPoint.getZ(\ ))/calculated\ distance$$

In some embodiments, an implementing device may obtain the initial estimate of the location of the signal source based on XYZ Cartesian coordinates of locations where the signals from the signal source were detected, using, for example, the average of all XYZ points. The estimate may be optimized to obtain the best-fit center, which returns the best-fit set of XYZ coordinates. The best-fit set of XYZ coordinates represent an optimized estimate of the three dimensional location of the signal source. The device may also construct a confidence interval from the best-fit set of XYZ coordinates.

In some embodiments, the device converts the best-fit XYZ coordinates to geodetic GPS coordinates. Various methods for conversion may be used to convert geocentric XYZ Cartesian coordinates to WGS-84 geodetic coordinates. The method used may be selected, for example, to provide programmatically cost-effective calculations (non-cubic, no iterations) for a precise result. The conversion may return a latitude, longitude, and altitude (in Height Above Ellipsoid) that may be input into any given geospatial program.

FIG. 7A illustrates an example method for baselining an area of operation (i.e., capturing baseline information in the area of operation), detecting signals in the area from a potential target device (or receiving information about such detected signals, e.g., from other sensing devices positioned in the area of operation), recording information about such signals, geolocating the potential target device based on the recorded information, and plotting the potential target device on a map. Although the method is described with respect to the devices of FIGS. 1-2, those of skill in the art will understand that any device configured to perform the one or more steps of the method in any technically feasible order falls within the scope of the present disclosure.

As shown in FIG. 7A, at 710, a device implementing a method as described herein (e.g., a small form-factor or mobile device) may arrive in or be deployed to the area of operation or a specific named area of interest. For example, a specific building housing an AP that a target is known to connect to may be deemed the area of interest. The area of interest may encompass an area in which WiFi devices other than the potential target device operate. One or more sensors may also be deployed to the same or nearby area. The user of an implementing device may begin capturing baseline information, which includes detecting signals in the area of operation, e.g., from the other WiFi devices. In some cases, The signals detected during the baseline capture are designated as noise. During or after the baseline capture, baseline information including information associated with the detected signals designated as noise may be stored in a database, as shown in FIG. 7A.

As shown at 730, the target device arrives in the area of operation or specific named area of interest, potentially along with other devices such as a laptop or phone. At 740, the user of the implementing device starts real-time capture to again detect signals in the area. During real-time capture, signals from the target device are received, potentially along with signals from other devices. The signals may be detected by the implementing device itself or by sensing devices deployed to the area of operation. In the case that sensing devices deployed in the area of operation detect such signals, the sensing devices may forward information about the detected signals to the implementing device, e.g., using an established connection or network interface. The detected signals include information associated with their transmitting devices (e.g., a device identifier such as a MAC address, manufacturer, and devices to which transmitting devices are connected), and are captured along with timestamps indicating the time at which the signals are received. As shown in FIG. 7A, the captured information may be recorded in a database (e.g., added to the baseline database and/or stored in a new database). During or after real-time capture is carried out, as shown at 750, the data captured in real-time is compared with the stored baseline information. The baseline information and information received during the real-time capture are filtered to obtain only information associated with newly discovered devices. For example, signals detected from newly discovered devices may be distinguished by the device identifiers included in the received signals.

At 760, the user may configure the implementing device to geolocate the newly discovered device using one or more methods as described in preceding paragraphs. In geolocating the newly discovered device, the implementing device may be configured to calculate three-dimensional locations (e.g., a set of geodetic GPS coordinates or cartesian coordinates) of the devices based on signal strengths of detected signals and based on three-dimensional locations where the signals were detected. The implementing device may store information associated with three-dimensional locations where the signals from newly discovered devices were received.

FIG. 7B is an illustration of a graphical user interface (GUI) displaying newly discovered devices on a map along with recorded data associated with the newly discovered devices, consistent with methods illustrated in FIG. 7A and described in detail in paragraphs above. An implementing device that carries out one or more of the steps described in FIG. 7A may include or be coupled with a display device configured to provide the GUI. The calculated three-dimensional locations of the newly discovered devices from which signals have been received are plotted graphically on a map within a GUI. The GUI may be configured to render graphical elements representing geographic data that is processed using a geographic information system. The GUI is also configured to display information captured from discovered devices during WiFi scans, including WiFi MAC addresses, type (i.e., AP/STA) and/or a BSSID or SSID associated with the discovered devices.

A user may configure the implementing device, via the GUI, to filter the stored data to identify MAC addresses of devices associated with the target. The user may "tag" each MAC address of interest with a unique identifier associated with the target. The implementing device may be configured to continuously monitor for signals from the target device and/or other devices in the area of interest based on the presence of signals associated with the unique identifier or with the MAC addresses. The user may configure the device with geo-fences for that target. The user may designate boundaries or a box using geocoordinates. If a MAC address (i.e., an address tagged with target's unique identifier) is detected within the geo-fence, the user may be informed of devices of interest possibly related to the target being within the designated geo-fence.

The implementing device may be configured via the GUI with one or more user options. For example, the user may configure a default real-time scan mode in which the device continuously scans and plots Wi-Fi and Bluetooth devices. The user may configure the device to find specific MAC address. For example, the user may (1) select a Wi-Fi MAC address of interest from the database containing stored MAC addresses; (2) select an icon associated with a MAC address that is displayed graphically on a map; or (3) manually enter a MAC address of interest. The device may then update a displayed image or map to exclude icons and/or data associated with other MAC addresses. For example, the device may display a map including an icon representing the signal of interest plotted at the estimated location of the signal source.

The device may display a heat map (e.g., better signal strength=hotter) and plot data representing the inputs used to calculate the location of the signal source. For instance, the latitude, longitude, and altitude of data displayed on the heat map comes from the data input of where the sensor was located at when the signal was detected. The heat of the plot may correspond with the signal strength (i.e., RRSI).

Alternatively (e.g., if heat maps are not supported by the geospatial tool), or additionally, the device may display graphical elements, such as transparent spheres, illustrating the latitude, longitude, and altitude of the locations where the signals were detected. In such cases, a radius of the transparent spheres may be derived from the RSSI-to-distance calculation. Colors similar to those used in a heatmap (e.g., green, amber, and red) may be used to illustrate the graphical elements based on the observed signal strength for each data point. The plotting of the graphical elements or transparent spheres may aid the user in visually locating the targeted signal on the map. For example, the user may be provided an indication on the map of the signal becoming "hotter" or "colder", which may be illustrated by a change in a characteristic of a graphical element. For instance, color, saturation, transparency, shading, or size may be altered to reflect a change in signal strength.

In various modes, if the MAC Address is detected by the system, the device may send a notification to the user (e.g., through vibratory, tactile, auditory, or visual feedback) to inform the user that the MAC address is interest has been detected.

In various modes, the device may be configured to plot historical data. For example, the user may configure the device to plot a selected area or selected MAC addresses given a date/time range.

In various modes, the device may be configured to filter by baseline or by time. For example, the user may choose to filter real-time results by a selected baseline or by a datetime range.

A device implementing at least of a portion of a method according to any one of the embodiments described herein may be a mobile device such as a cellular phone, a tablet, a portable computer, a wearable device such as a smart watch, a vehicle, or any other device having processing means and signal detection capabilities. Furthermore, although the above-described embodiments reference small form-factor and mobile devices, those of skill in the art will appreciate that at least a portion of a method according to any one of the embodiments may be performed by any stationary device having processing means and signal detection capabilities, operating in conjunction with other mobile and/or stationary devices to detect signals in an area of operation.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method comprising:
    capturing baseline information by detecting signals in an area of operation during a time period;
    capturing real-time information by detecting signals in the area of operation during a subsequent time period, wherein one or more of the signals detected in the area of operation during the subsequent time period are from a target device within the area of operation, wherein the one or more signals from the target device include information indicating a device identifier associated with the target device;
    filtering the baseline information and the real-time information based on the indicated device identifier to identify information associated with signals from the target device;
    calculating a three-dimensional location of the target device based on a signal strength of the one or more signals from the target device and location information associated with locations where the one or more signals from the target device were detected; and
    plotting the three-dimensional location of the target device on a map within a graphical user interface (GUI).

2. The method of claim 1 comprising:
    storing the location information associated with the locations where the one or more signals were detected, each of the location information including: geodetic Global Positioning Satellite (GPS) coordinates comprising a latitude and a longitude; and an altitude.

3. The method of claim 2 wherein calculating the three-dimensional location of the target device comprises determining weighting coefficients for each of the stored location information associated with the locations where the one or more signals from the target device were detected, wherein each of the weighting coefficients is based on a respective signal strength associated with a respective one of the locations where the one or more signals from the target device were detected.

4. The method of claim 2 wherein calculating the three-dimensional location of the target device comprises converting each of the location information to respective sets of geocentric Cartesian coordinates.

5. The method of claim 4 wherein calculating the three-dimensional location of the target device comprises calculating, based on a received signal strength and a frequency of the one or more signals from the target device, a distance between each of the locations where the one or more signals from the target device were detected and the target device.

6. The method of claim 5 wherein calculating the three-dimensional location of the target device comprises determining, based on the calculated distances and the respective sets of geocentric Cartesian coordinates, a set of geocentric Cartesian coordinates representing an estimate of the three-dimensional location of the target device.

7. The method of claim 6 wherein calculating the three-dimensional location of the target device comprises performing a least squares regression analysis based on the set of geocentric Cartesian coordinates representing the estimate of the three-dimensional location of the target device and the respective sets of geocentric Cartesian coordinates to determine a set of geocentric Cartesian coordinates representing an optimized estimate of the three-dimensional location of the target device.

8. The method of claim 7 wherein calculating the three-dimensional location of the target device comprises converting the set of geocentric Cartesian coordinates representing the optimized estimate of the three-dimensional location of the target device to a set of geodetic coordinates representing the optimized estimate of the three-dimensional location of the target device.

9. The method of claim 5, wherein the calculated distances between each of the locations where the one or more signals from the target device were detected and the three-dimensional location of the target device are calculated based on an environment in which the signals were detected.

10. The method of claim 1 comprising continuously monitoring, based on the device identifier, for signals from the target device to track the three-dimensional location of the target device in real time.

11. A mobile device comprising:
    a processor;
    a transceiver; and
    a display;
    the processor and the transceiver configured to capture baseline information by detecting signals in an area of operation during a time period;
    the processor and the transceiver configured to capture real-time information by detecting signals in an area of operation during a subsequent time period, wherein one or more of the signals detected in the area of operation during the subsequent time period are from a target device within the area of operation, wherein the one or more signals from the target device include information indicating a device identifier associated with the target device;

the processor configured to filter the baseline information and the real-time information based on the indicated device identifier to identify information associated with signals from the target device;

the processor configured to calculate a three-dimensional location of the target device based on a signal strength of the one or more signals from the target device and location information associated with locations where the one or more signals from the target device were detected; and the processor and the display configured to plot the three-dimensional location of the target device on a map within a graphical user interface (GUI).

12. The mobile device of claim 11, the processor configured to store the location information associated with the locations where the one or more signals were detected, each of the location information including: geodetic Global Positioning Satellite (GPS) coordinates comprising a latitude and a longitude; and an altitude.

13. The mobile device of claim 12, the processor configured to calculate the three-dimensional location of the target device by determining weighting coefficients for each of the stored location information associated with the locations where the one or more signals from the target device were detected, wherein each of the weighting coefficients is based on a respective signal strength associated with a respective one of the locations where the one or more signals from the target device were detected.

14. The mobile device of claim 12, the processor configured to calculate the three-dimensional location of the target device by converting each of the location information to respective sets of geocentric Cartesian coordinates.

15. The mobile device of claim 14, the processor configured to calculate the three-dimensional location of the target device, based on a received signal strength and a frequency of the one or more signals from the target device, by calculating a distance between each of the locations where the one or more signals from the target device were detected and the target device.

16. The processor of claim 15, the processor configured to calculate the three-dimensional location of the target device by determining, based on the calculated distances and the respective sets of geocentric Cartesian coordinates, a set of geocentric Cartesian coordinates representing an estimate of the three-dimensional location of the target device.

17. The mobile device of claim 16, the processor configured to calculate the three-dimensional location of the target device by performing a least squares regression analysis based on the set of geocentric Cartesian coordinates representing the estimate of the three-dimensional location of the target device and the respective sets of geocentric Cartesian coordinates to determine a set of geocentric Cartesian coordinates representing an optimized estimate of the three-dimensional location of the target device.

18. The mobile device of claim 17, the processor configured to calculate the three-dimensional location of the target device by converting the set of geocentric Cartesian coordinates representing the optimized estimate of the three-dimensional location of the target device to a set of geodetic coordinates representing the optimized estimate of the three-dimensional location of the target device.

19. The mobile device of claim 15, wherein the calculated distances between each of the locations where the one or more signals from the target device were detected and the target device is calculated based on an environment in which the signals were detected.

20. The mobile device of claim 11, the processor and the transceiver configured to continuously monitor for signals from the target device to track the three-dimensional location of the target device in real time.

* * * * *